(12) United States Patent
Hasimoto

(10) Patent No.: US 6,243,341 B1
(45) Date of Patent: Jun. 5, 2001

(54) METHOD OF DISTINGUISHING DISKS HAVING NEARLY THE SAME REFLECTANCE

(75) Inventor: Hiroyosi Hasimoto, Kyotanabe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/139,698

(22) Filed: Aug. 25, 1998

(30) Foreign Application Priority Data

Aug. 26, 1997 (JP) ............................................. 9-229507 (P)

(51) Int. Cl.[7] ...................................................... G11B 7/00
(52) U.S. Cl. ................... 369/53.22; 369/44.27; 369/53.23
(58) Field of Search .................. 369/58, 44.27, 369/54, 94, 44.25

(56) References Cited

U.S. PATENT DOCUMENTS

| | | | |
|---|---|---|---|
| 5,790,493 | * 8/1998 | Takeya et al. | 369/58 |
| 5,986,985 | * 11/1999 | Kawamura et al. | 369/58 |
| 6,058,082 | * 5/2000 | Hwang | 369/58 |

FOREIGN PATENT DOCUMENTS

| | | |
|---|---|---|
| 0727776 | 8/1996 | (EP) . |
| 0790604 | 8/1997 | (EP) . |
| 61-042751 | 3/1986 | (JP) . |
| 3181062 | 8/1991 | (JP) . |
| 8293153 | 11/1996 | (JP) . |
| 10055602 | 2/1998 | (JP) . |
| 9708691 | 3/1997 | (WO) . |

* cited by examiner

*Primary Examiner*—Thang V. Tran
(74) *Attorney, Agent, or Firm*—Hogan & Hartson, LLP

(57) ABSTRACT

According to a method of distinguishing optical disks, focus search operation is performed with an optical pickup in a CD reproduction state, and the maximum value and the minimum value of an output from the pickup obtained by the focus search operation are detected to determine a first waveform level as a difference between the maximum value and the minimum value. Focus search operation is further performed with the optical pickup in a DVD reproduction state, and the maximum value and the minimum value of an output from the pickup obtained by the focus search operation are detected to determine a second waveform level as a difference between the maximum value and the minimum value. Disk types are distinguished by comparing a ratio between the first waveform level and the second waveform level with a prescribed value.

4 Claims, 6 Drawing Sheets

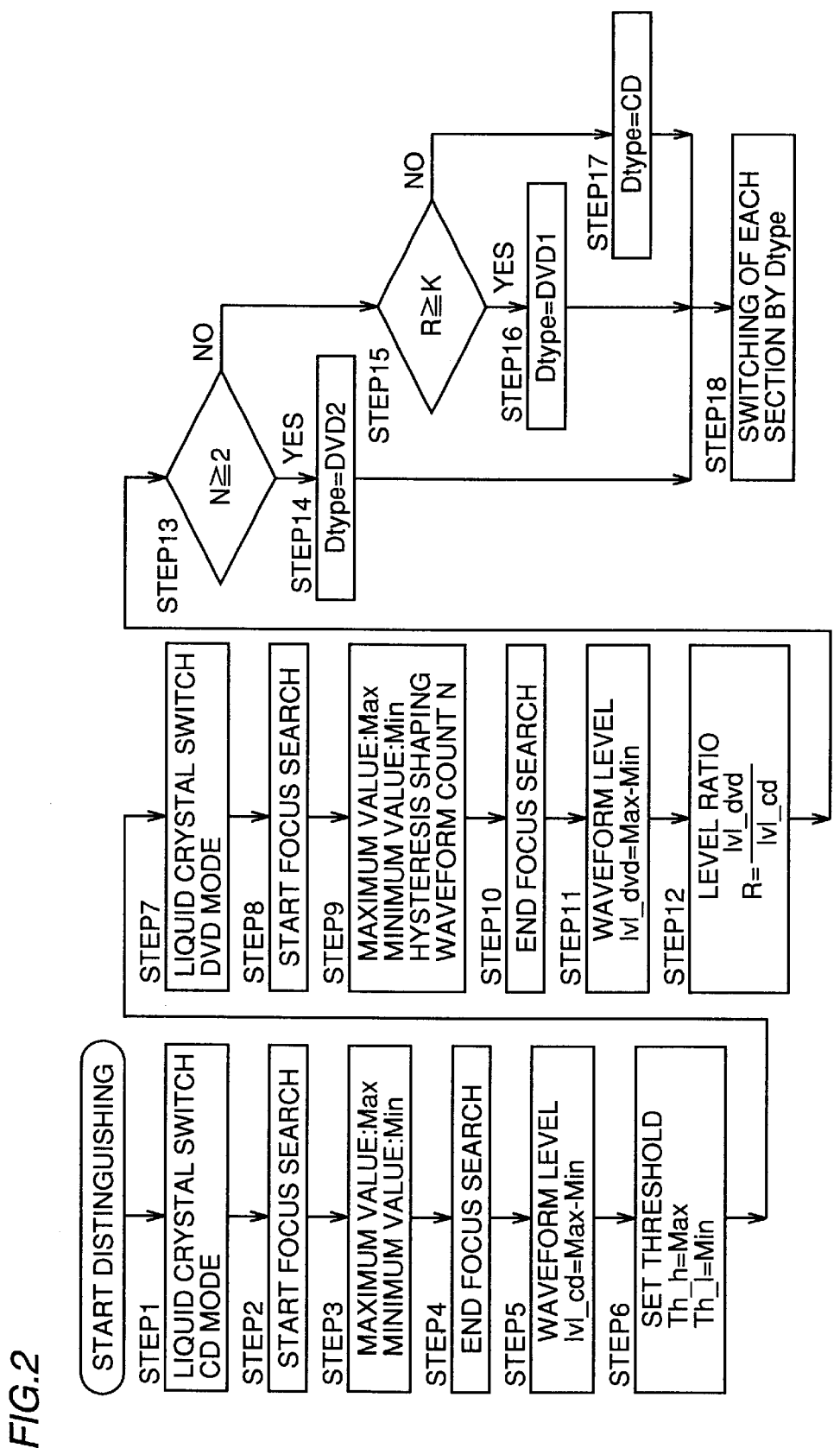

*FIG.5A*  
CD MODE SEARCH
*FIG.5B*  
DVD MODE SEARCH
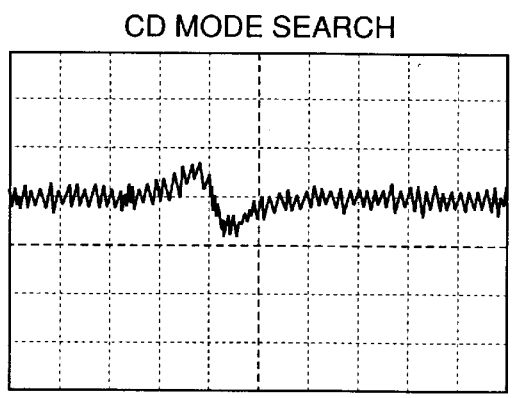
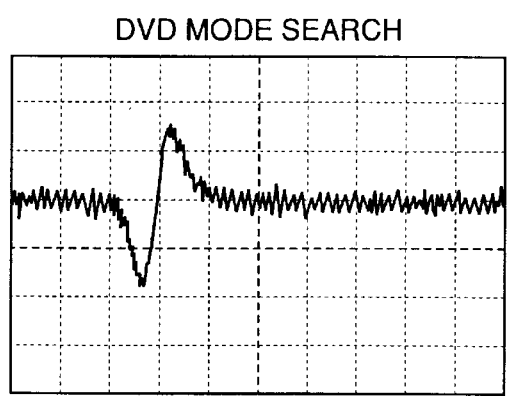
S CURVE CHARACTERISTIC (SINGLE DVD)
*FIG.6A*  
CD MODE SEARCH
*FIG.6B*  
DVD MODE SEARCH
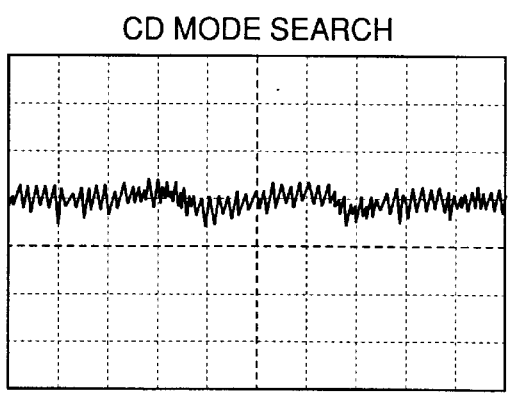
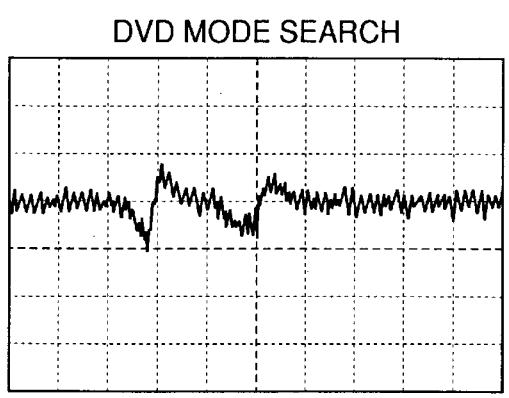
S CURVE CHARACTERISTIC (DUAL DVD)
*FIG.7A*  
CD MODE SEARCH
*FIG.7B*  
DVD MODE SEARCH
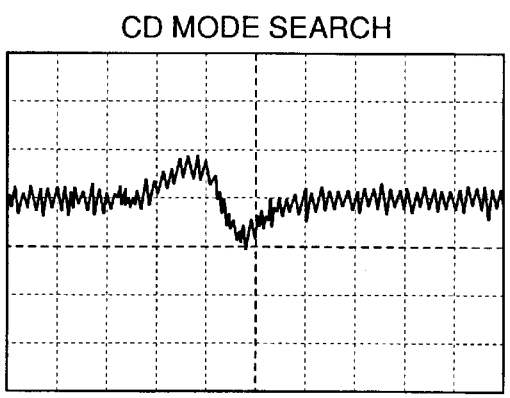
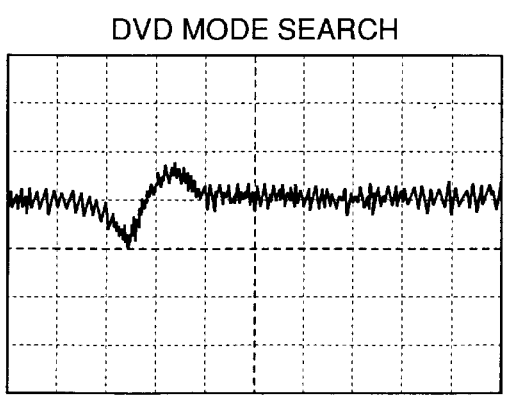
S CURVE CHARACTERISTIC (CD DISK)

HYSTERESIS
SHAPING

METHOD OF DISTINGUISHING DISKS HAVING NEARLY THE SAME REFLECTANCE

BACKGROUND OF THE INVENTION

1. Field of the Invention

The present invention relates to a method of distinguishing disks, and particularly relates to a method of distinguishing a particular type of disk from different types of disks on which signals are recorded in different formats respectively, according to an output from an optical pickup.

2. Description of the Background Art

It is important to make a DVD (Digital Video Disk) reproduction apparatus compatible with CD (Compact Disk) reproduction in view of utilization of abundant soft resources of the CD. Therefore, an art of providing the DVD reproduction apparatus with a compatible CD reproduction function is required.

Regarding the specifications of the CD and the DVD, they are different in the physical specification and the recording signal specification as shown in Table 1 and Table 2, and accordingly switching of the pickup and control thereof corresponding to respective disks are necessary.

TABLE 1

Physical Specification of Disk

|  | DVD | CD |
|---|---|---|
| Disk Substrate Thickness (mm) | 0.6 | 1.2 |
| Disk Structure | two sheets attached | single sheet |
| Minimum Pit Length (mm) | 0.4 | 0.83 |
| Track Pitch (mm) | 0.74 | 1.6 |

TABLE 2

Recording Signal Specification

|  | DVD | CD |
|---|---|---|
| Signal Modulation System | 8/16 modulation | 8/15 modulation |
| Transfer Rate (Mbps) | 11.08 | 2.03 |

The disc distinguishing methods interesting to the present invention are disclosed in Japanese Patent Laying-Open Nos. 61-42751 and 3-181062, for example.

According to a conventional method, a disk type is identified by the difference of reflectance for a light beam among recording media such as an optical disk. When disks having nearly the same reflectance such as the DVD and CD are to be distinguished, an allowable error of reference values are small to make it difficult to correctly distinguish them due to variation of an RF signal or the like.

Further, the level of a focus error signal for a dual DVD is low compared with that for a single DVD to be easily subjected to noises of a circuit or the like. Therefore, to physically distinguish between the dual DVD and the single DVD using the conventional method described above is difficult.

SUMMARY OF THE INVENTION

An object of the present invention is to provide a method of distinguishing disks according to which those disks having almost the same reflectance can be correctly distinguished.

Another object of the present invention is to provide a method of distinguishing disks which is not easily subjected to the influence of noises.

Still another object of the present invention is to provide a method of distinguishing disks according to which a compact disk (CD) and a digital video disk (DVD) can be correctly distinguished.

Still another object of the present invention is to provide a disk reproduction apparatus by which control and setting according to disks with signals to be reproduced are possible without manipulation by an operator, and accordingly reproduction suitable for the disks is achieved.

The objects described above of the present invention are achieved by a method of distinguishing disks including the steps below. Specifically, the method of distinguishing disks according to one aspect of the present invention includes the steps of performing focus search operation with an optical pickup in a first disk reproduction state, detecting the maximum value and the minimum value of an output from the pickup obtained by the focus search operation to determine a first waveform level as a difference between the maximum value and the minimum value, performing focus search operation with the optical pickup in a second disk reproduction state, detecting the maximum value and the minimum value of an output from the pickup obtained by the focus search operation to determine a second waveform level as a difference between the maximum value and the minimum value, and comparing a ratio between the first waveform level and the second waveform level with a prescribed value.

Disks are distinguished from each other by comparing, a ratio between a difference between the maximum and minimum values of an output from the pickup obtained by the first disk focus search and a difference between the maximum and minimum values of an output from the pickup obtained by the second disk focus search, with a prescribed value. The ratio is determined correspondingly to respective disks irrespective of the reflectance. Therefore, it is possible to provide a method of distinguishing disks by which disks having nearly the same reflectance can be precisely distinguished.

According to another aspect of the invention, a method of distinguishing different types of disks is characterized in that the type of disk is identified based on the number of times peak-to-valley of a focus error signal repeats. The method includes the steps of comparing a sum of a first threshold value and a prescribed value with a focus error signal, changing a level of a binary signal when the focus error signal exceeds the sum, thereafter comparing a difference obtained by subtracting a second threshold value from a prescribed value with the focus error signal, changing the level of the binary signal when the focus error signal becomes smaller than the difference, and distinguishing disk types by the number of times the level of the binary signal changes.

The disks can be correctly distinguished by detecting the number of times the level of the binary signal changes in the focus error search since the number is determined correspondingly to respective disks.

Preferably, the first and second threshold values respectively correspond to those values obtained by multiplying by a prescribed value the maximum value and the minimum value of an output from an optical pickup produced when focus search operation is executed by setting the optical pickup in a compact disk reproduction state.

The output from the pickup obtained by the focus search in the CD reproduction state is smaller than an output from the pickup, for example, obtained by the focus search in a DVD reproduction state. Accordingly, dispersion of detected signals does not seriously affect the distinguishing operation when the pickup output obtained by the focus search in the CD reproduction state is used as a reference. Consequently, a method of distinguishing disks which is not easily subjected to influence of noises can be provided.

According to another aspect of the invention, a disk reproduction apparatus capable of reproduction from a first disk and from a second disk different from the first disk includes an optical pickup that detects a reproduction signal from the first or the second disk. The optical pickup is used to execute focus operation selectively in a first reproduction state suitable for reproduction from the first disk and in a second reproduction state suitable for reproduction from the second disk. The disk reproduction apparatus includes a detector detecting a first difference between the maximum value and the minimum value of an output from the optical pickup obtained by the focus operation in the first reproduction state as well as a second difference between the maximum value and the minimum value of an output from the optical pickup obtained by the focus operation in the second reproduction state, an arithmetic unit calculating a ratio between the first difference and the second difference, a comparator comparing the calculated ratio with a prescribed value, and a controller controlling the reproduction apparatus to accomplish reproduction suitable for the first or the second disk based on the result of the comparison by the comparator.

Using the optical pickup, focus operation is executed for the first or the second disk selectively in the first reproduction state suitable for reproduction from the first disk or in the second reproduction state suitable for reproduction from the second disk, the ratio between the differences between the maximum values and the minimum values of respective outputs obtained in the focus operation in the first and second reproduction states is calculated, and based on the calculated ratio, reproduction suitable for the first or the second disk is performed. Consequently, a disk reproduction apparatus by which control and setting corresponding to disks are possible without manipulation by an operator and reproduction suitable for the disks is achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows a flow chart of a process of distinguishing disks according to the present invention.

FIGS. 5A and 5B graphically show waveforms of focus error signals in a single DVD.

FIGS. 6A and 6B graphically show waveforms of focus error signals in a dual DVD.

FIGS. 7A and 7B graphically show waveforms of focus error signals in a CD.

DESCRIPTION OF THE PREFERRED EMBODIMENTS

An embodiment of a disk distinguishing apparatus according to the present invention is hereinafter described referring to the figures.

Figure 1:
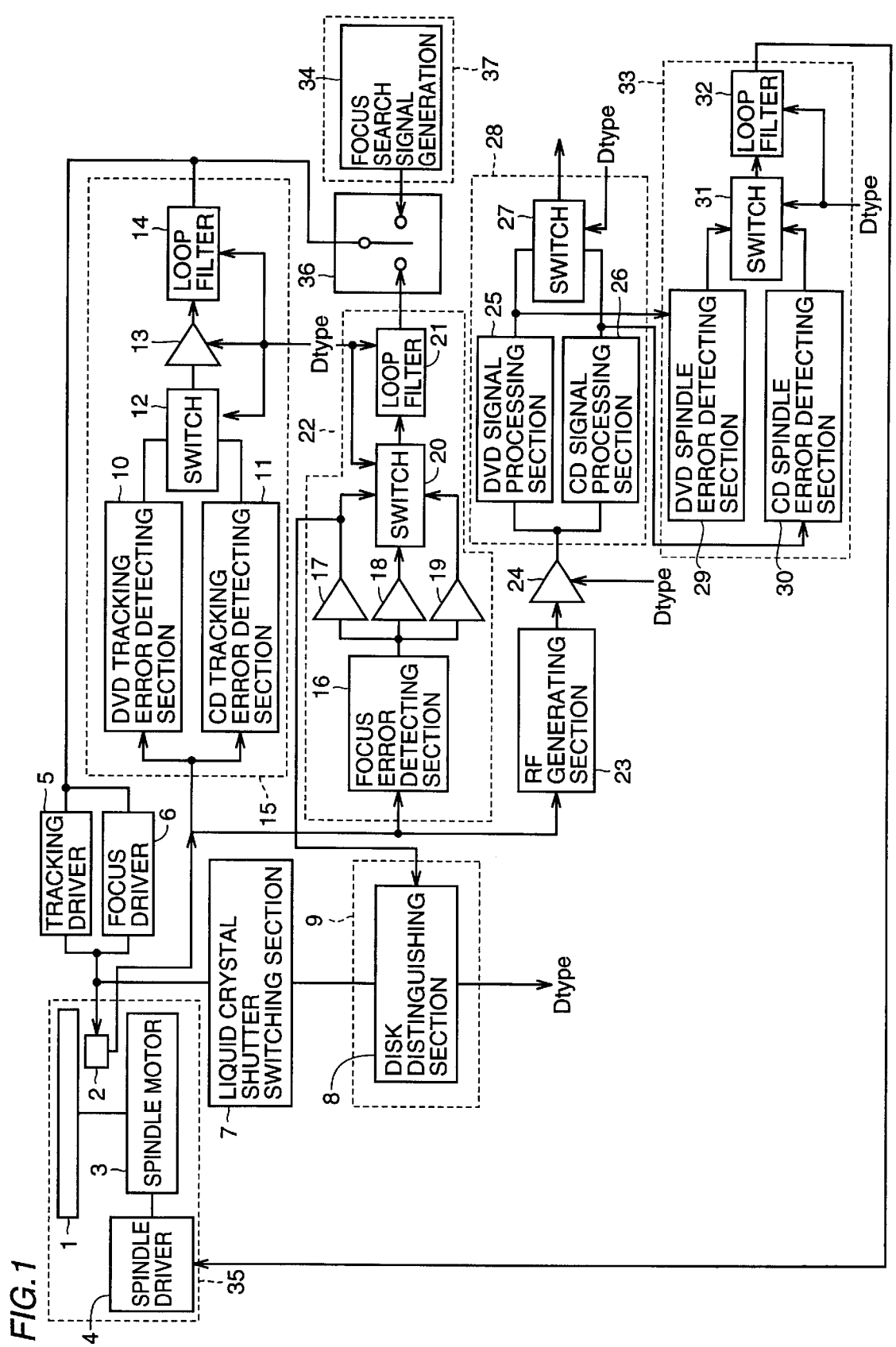
FIG. 1 is a block diagram showing a structure of a disk distinguishing apparatus according to the present invention.
Figure 3A:
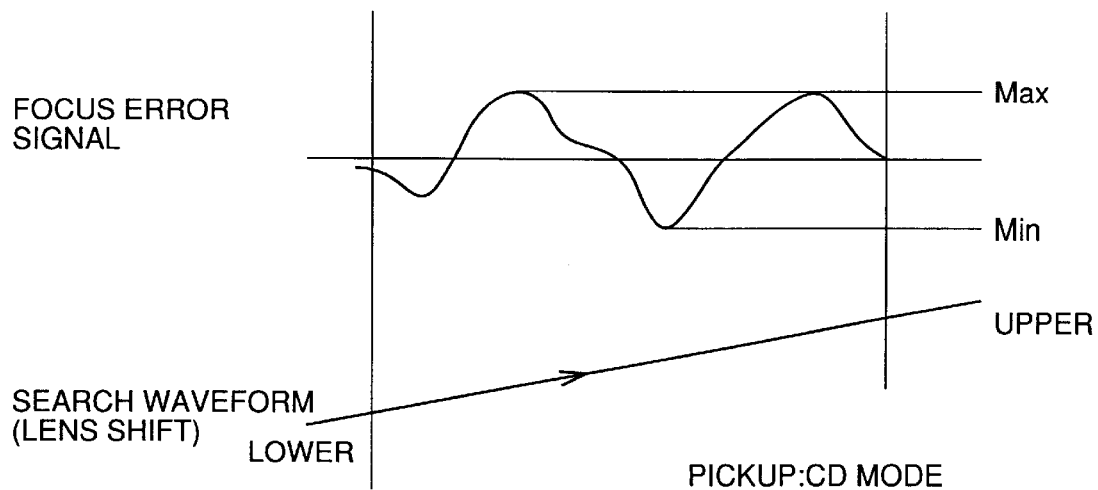
FIGS. 3A and 3B graphically show focus error signals in forward focus search.
Figure 3B:
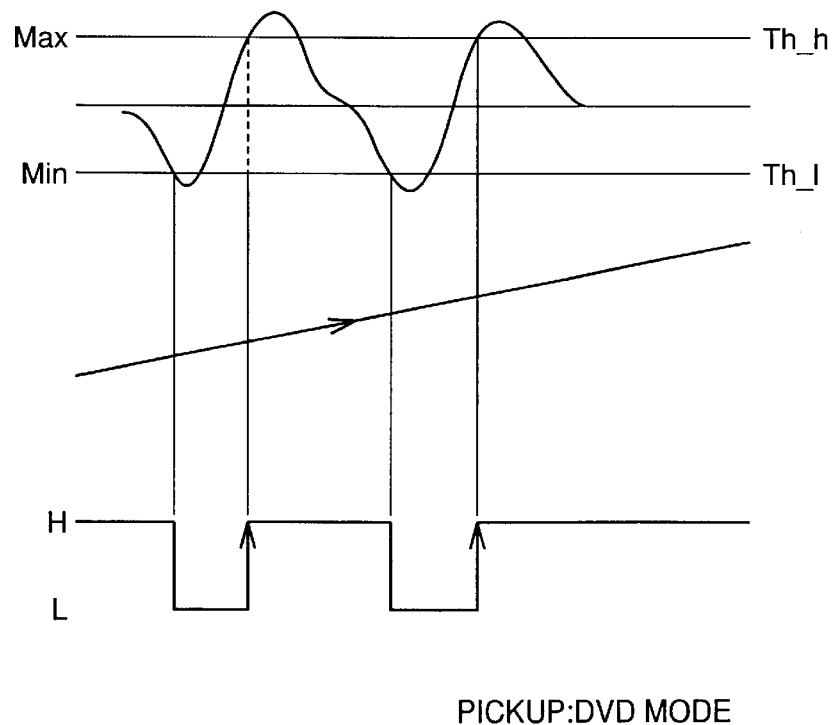
Figure 4A:
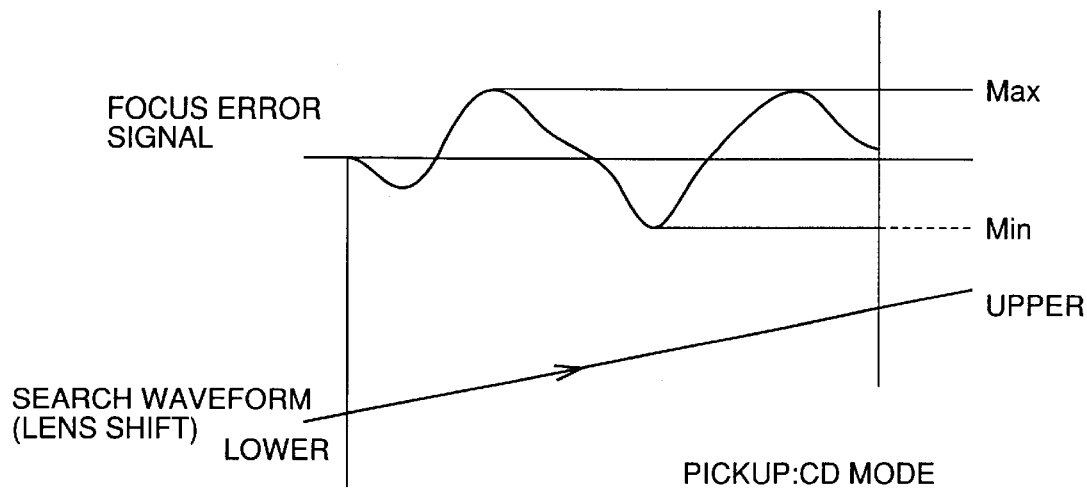
FIGS. 4A and 4B graphically show focus error signals in backward focus search.
Figure 4B:
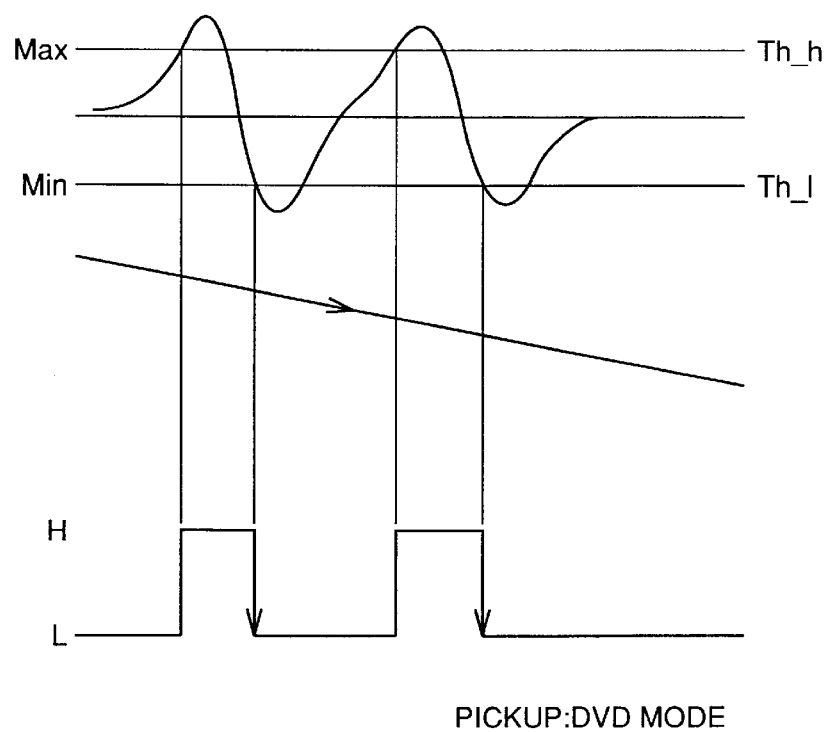

Referring to FIG. 1, the disk distinguishing apparatus includes a signal reading section 35, a tracking servo section 15, a focusing servo section 22, a spindle servo section 33, a disk distinguishing section 8, a DVD/CD signal processing section 28, and a focus search signal generation section 34 implemented by a microprocessor 37.

Signal reading section 35 rotates by a spindle motor 3 an optical recording media 1 (specifically DVD or CD) to be distinguished, reads a signal by an optical pickup 2 to output it as a sensor signal.

The optical pickup 2 used here is the one according to the liquid crystal shutter system, for example. The pickup of the liquid crystal shutter system blocks a laser beam directed onto an objective lens of the pickup by a liquid crystal shutter to change a numerical aperture (NA) such that the pickup is set into a mode corresponding to the DVD or the CD.

Description of the embodiment employing such a pickup is given below.

The output sensor signal is supplied to tracking servo section 15, focus servo section 22, and DVD/CD signal processing section 28.

Disk distinguishing section 8 identifies the type of disk by a focus error signal (FE signal) to output a disk type signal (Dtype signal).

Each control section executes control according to Dtype signal.

Tracking servo section 15 detects a tracking error from the sensor signal. Tracking servo section 15 executes tracking error detection 10 according to the phase difference method when Dtype signal identifies a DVD, and executes tracking error detection 11 according to the three-beam system when Dtype signal identifies a CD.

An input to and the gain of an amplifier are thereafter changed by Dtype signal to be output to a tracking driver 5 through a loop filter 14.

Focus servo section 22 detects a focus error from the sensor signal by the astigmatism method.

The focus error signal is supplied to amplifiers 17, 18 and 19 corresponding to respective disks to be changed by Dtype signal, and the amplified one is output to a focus diver 6 through a loop filter 21 and switch 36.

In DVD/CD signal processing section 28, an RF signal is generated based on the sensor signal and amplified by an RF amplifier 24 and thereafter DVD signal processing 25 or CD signal processing 26 is performed according to Dtype signal.

Spindle servo section 33 outputs a spindle error signal of the DVD or the CD corresponding to Dtype signal to a spindle driver 4 through a loop filter 32.

The types of the disks are thus distinguished and accordingly switching of the pickup, rotation of the disk, focus control and tracking control suitable for each type of the disk are executed.

According to the flow chart shown in FIG. 2, disks are distinguished by disk distinguishing section 8 of a microcomputer 9.

In Step 1–Step 5 of the flow chart, focus search operation in a CD mode is performed, and in Step 6–Step 11, focus search operation in a DVD mode is performed. In Step 12–Step 17, processes for distinguishing disks are performed.

Operations in the flow chart will be described in detail below.

After the start of a disk distinguishing program, in Step 1, a liquid crystal switch of the pickup of the liquid crystal shutter system is set into the CD mode, specifically an operation mode for reading signals from the CD.

In Step 2, focus search is started to detect the maximum value Max and the minimum value Min of a focus error signal.

The maximum value and the minimum value of the focus error signal are as shown in FIGS. 3A, 3B, 4A, and 4B. The level of the focus error signal changes according to the distance between the pickup and the disk when the lens of the pickup is successively shifted in a region including a focusing region.

The signal waveform observed in those figures represents a focus error detection feature referred to as S curve, and the operation of shifting the lens is referred to as focus search.

The waveform of the focus error signal varies in accordance with the type of the disk and has characteristics listed below corresponding to a combination of the type of the disk and the operation mode of the pickup.

1. Reproduction from DVD by DVD mode pickup

The level of the focus error signal is high due to the presence of the focus.

2. Reproduction from CD by DVD mode pickup

The waveform distorts and the level is low since there is out of focus.

3. Reproduction from DVD by CD mode pickup

The level is low since the quantity of light is small although there is focus.

4. Reproduction from CD by CD mode pickup

Although there is focus, the level decreases due to the small quantity of light.

In the case of the dual-layer DVD (dual DVD), focusing at two locations on the upper side and the lower side produces two repetitions of the peak-to-valley of the S curve.

The signal level of the dual-layer disk is normally lower than that of a single-layer disk.

Actual signal waveforms are illustrated in FIGS. 5A–7B. Values of the waveform level (Max-Min in FIGS. 3A–4B) are listed in Table 3.

TABLE 3

| Search Mode | CD Mode | DVD Mode | Ratio (DVD/CD) | Repetition of Waveform |
|---|---|---|---|---|
| Sibgle DVD | 0.55 Vpp | 1.6 Vpp | 2.9 | 1 |
| Dual DVD | 0.25 Vpp | 0.65 Vpp | 2.6 | 2 |
| CD | 0.70 Vpp | 0.70 Vpp | 1.0 | 1 |

After the focus search is completed in Step 4, in Step 5, a waveform level lvl_cd is determined as a difference between the maximum value Max and the minimum value Min.

In Step 6, threshold values Th_h and Th_l are set at Max and Min respectively in order to apply a hysteretic signal processing.

Next in Step 7, the liquid crystal switch of the pickup is set into the DVD mode.

In Step 8, the focus search is started to detect the maximum value Max and the minimum value Min in Step 9.

Hysterisis waveform shaping of the S curve signal is further executed, the number of rise or fall of the waveform is counted and the number is determined as N.

Figure 8:
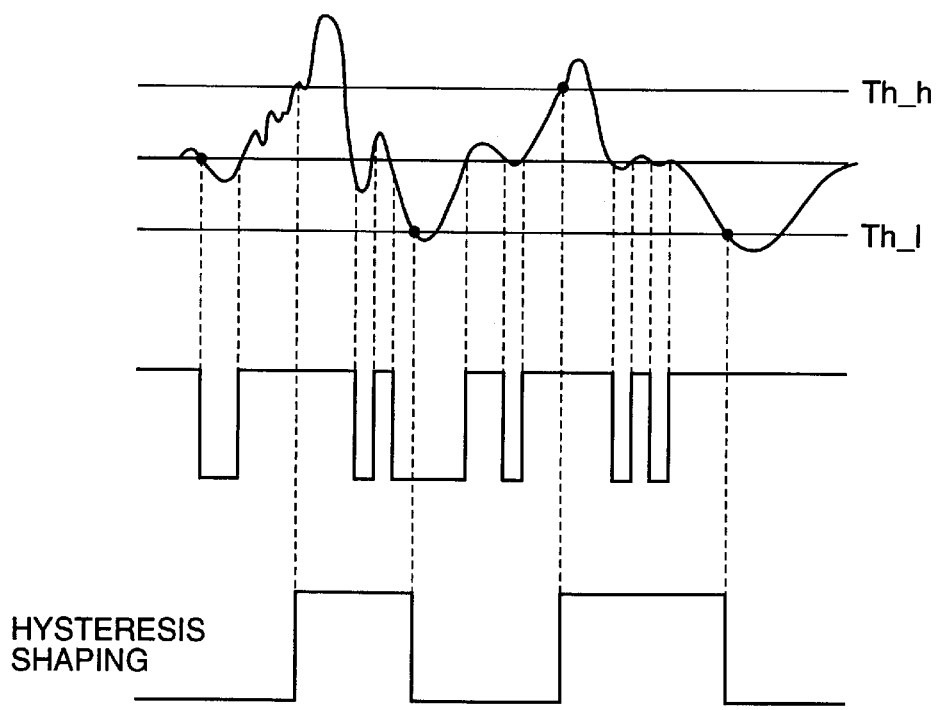
FIG. 8 graphically shows hysterisis shaping.

In the hysterisis waveform shaping, a pair of threshold values of a higher one and a lower one are set, and the waveform level is set at an H level when the level exceeds the upper threshold value (Th_h) and at an L level when the waveform level thereafter becomes smaller than the lower threshold value (Th_l) as shown in FIG. 8.

The waveform shaping thus eliminates the influence of noises between the threshold values.

Figure 9:
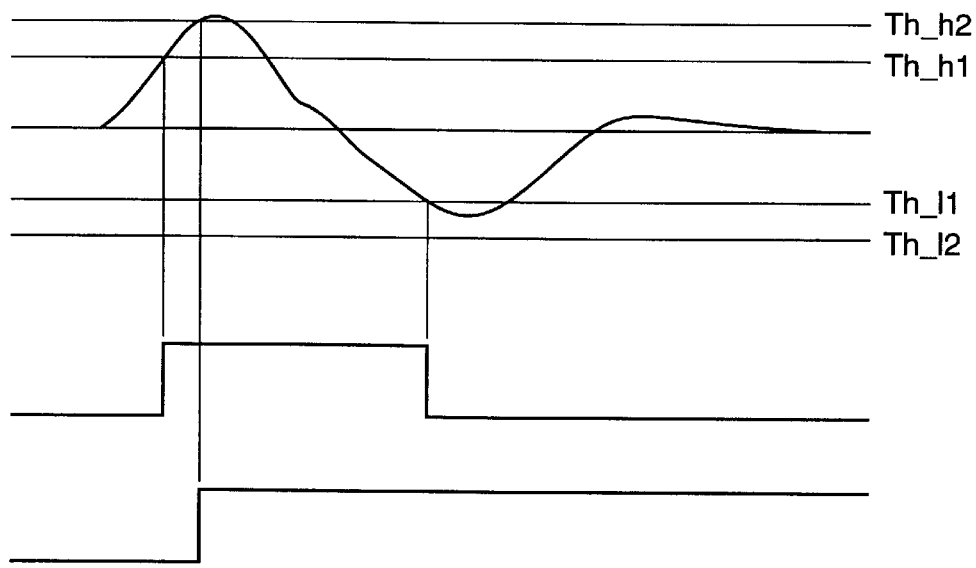
FIG. 9 graphically shows hysterisis shaping according to the present invention.

In the setting of the upper and lower threshold values, the influence of noises decreases as the waveform level approaches the maximum value and the minimum value as shown in FIG. 9. However, if the maximum value or the minimum value of the waveform level is lower than the threshold value, the number of times the waveform of the S curve signal repeats cannot be counted correctly.

The absolute level of the focus error signal disperses depending on the quantity of light or the signal level of the detector. Therefore, the number of repetitions could be counted erroneously if the threshold value is set at a fixed value.

Accordingly, in the case of the DVD, when a signal is read by setting the pickup into the CD mode, the obtained signal level is lower than the signal level of the DVD. Therefore, the threshold values are set based on the obtained signal level to perform the hysterisis shaping when the pickup is set into the DVD mode.

Th_h and TH_l determined in Step 6 are accordingly used as the threshold values.

After the focus search is completed in Step 10, a difference between the maximum value Max and the minimum value Min is determined as waveform level lvl_dvd in Step 11.

Based on the count value N of the number of times the S curve repeats as well as level lvl_cd in the CD mode and level lvl_dvd in the DVD mode, a process for distinguishing disks is executed in Steps 12–17.

In Step 12, a ratio R between lvl_cd and lvl_dvd is determined.

If N is determined to be at least 2 in Step 13, the disk type is identified as the dual DVD (Step 14).

If N is determined to be 1 or less in Step 13, in Step 15, R is compared with a reference value K which is set in advance.

K is a threshold value used for identification, selected as an appropriate value of over 1 (K>1). K=1.5 is the most appropriate value.

If R is equal to K or more as a result of the comparison, the disk type is identified as the single DVD (step 16).

If R is smaller than K, the disk type is identified as the CD. A disk type signal according to the disk type is thereafter supplied to each section of a control circuit (step 18).

The disk type signal is supplied to tracking servo section 15, focus servo section 22, DVD/CD signal processing section 28 and spindle servo section 33 as Dtype signal described above, and each control section executes control according to Dtype signal.

Although description of the pickup of the liquid crystal shutter system is given regarding this embodiment, the embodiment is applicable to an ordinary multiple reproduction pickup according to the lens switching method or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of distinguishing disks, comprising the steps of:

performing a first focus search operation with an optical pickup in a first disk reproduction state;

detecting a first maximum value and a first minimum value of an output from the optical pickup obtained by said first focus search operation to determine a first waveform level as a difference between the first maximum value and the first minimum value;

performing a second focus search operation with the optical pickup in a second disk reproduction state;

detecting a second maximum value and a second minimum value of an output from the optical pickup obtained by said second focus search operation to determine a second waveform level as a difference between the second maximum value and the second minimum value; and comparing a ratio between said first waveform level and said second waveform level with a prescribed value to distinguish disk types.

2. A method of distinguishing disks, comprising the steps of:

performing a first focus search operation with an optical pickup in a CD reproduction state;

detecting a first maximum value and a first minimum value of an output from the optical pickup obtained by said first focus search operation to determine a first waveform level as a difference between the first maximum value and the first minimum value;

performing a second focus search operation with the optical pickup in a DVD reproduction state;

detecting a second maximum value and a second minimum value of an output from the optical pickup obtained by said second focus search operation to determine a second waveform level as a difference between the second maximum value and the second minimum value; and comparing a ratio between said first waveform level and said second waveform level with a prescribed value to distinguish disk types.

3. A disk reproduction apparatus capable of reproduction from a first disk and from a second disk different from said first disk, comprising:

an optical pickup for obtaining a reproduction signal from said first disk or said second disk;

means for performing focus operation for said first or second disk using said optical pickup selectively in a first reproduction state suitable for reproduction from said first disk and in a second reproduction state suitable for reproduction from said second disk;

means for detecting a first difference between the maximum value and the minimum of an output from said optical pickup obtained by said focus operation in said first reproduction state, and a second difference between the maximum value and the minimum value of an output from said optical pickup obtained by said focus operation in said second reproduction state;

means for calculating a ratio between said first difference and said second difference;

means for comparing the calculated ratio with a prescribed value; and means for controlling said reproduction apparatus to perform reproduction suitable for said first or second disk based on a result of comparison by said comparison means.

4. The disk reproduction apparatus according to claim 3, wherein said first disk is CD and said second disk is DVD.

* * * * *